(12) United States Patent
Nakanishi

(10) Patent No.: US 9,336,449 B2
(45) Date of Patent: May 10, 2016

(54) VEHICLE RECOGNITION DEVICE

(71) Applicant: HONDA MOTOR CO., LTD., Minato-ku, Tokyo (JP)

(72) Inventor: Yuichi Nakanishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/658,858

(22) Filed: Mar. 16, 2015

(65) Prior Publication Data

US 2015/0310286 A1    Oct. 29, 2015

(30) Foreign Application Priority Data

Apr. 24, 2014 (JP) ................. 2014-090735

(51) Int. Cl.
*G06K 9/00* (2006.01)
(52) U.S. Cl.
CPC .................. *G06K 9/00825* (2013.01)
(58) Field of Classification Search
CPC .......... G06K 9/00798; G06K 9/00805; G06K 9/00791; G06K 9/00825; G06K 2209/01; G06K 9/3233; G08G 1/017; G08G 1/205
See application file for complete search history.

(56) References Cited

FOREIGN PATENT DOCUMENTS

| JP | 2009-230530 | * 10/2009 | ............... G06T 7/60 |
|----|-------------|-----------|--------------------------|
| JP | 2009-230530 A | 10/2009 | |

* cited by examiner

*Primary Examiner* — Amara Abdi
(74) *Attorney, Agent, or Firm* — Carrier Blackman & Associates, P.C.; Joseph P. Carrier; William D. Blackman

(57) ABSTRACT

A vehicle recognition device 1 has a characteristic region identifying unit 5 that identifies two characteristic regions 9 arranged in a horizontal direction in an image 6 from an imaging unit 2, and a region outer end identifying unit 10 that identifies outer ends 11 in the horizontal direction of the two characteristic regions 9. The region outer end identifying unit 10 identifies a corrected outer end 15 in the case where the difference in width in the horizontal direction between the two characteristic regions 9 is not a predetermined value or less.

2 Claims, 3 Drawing Sheets

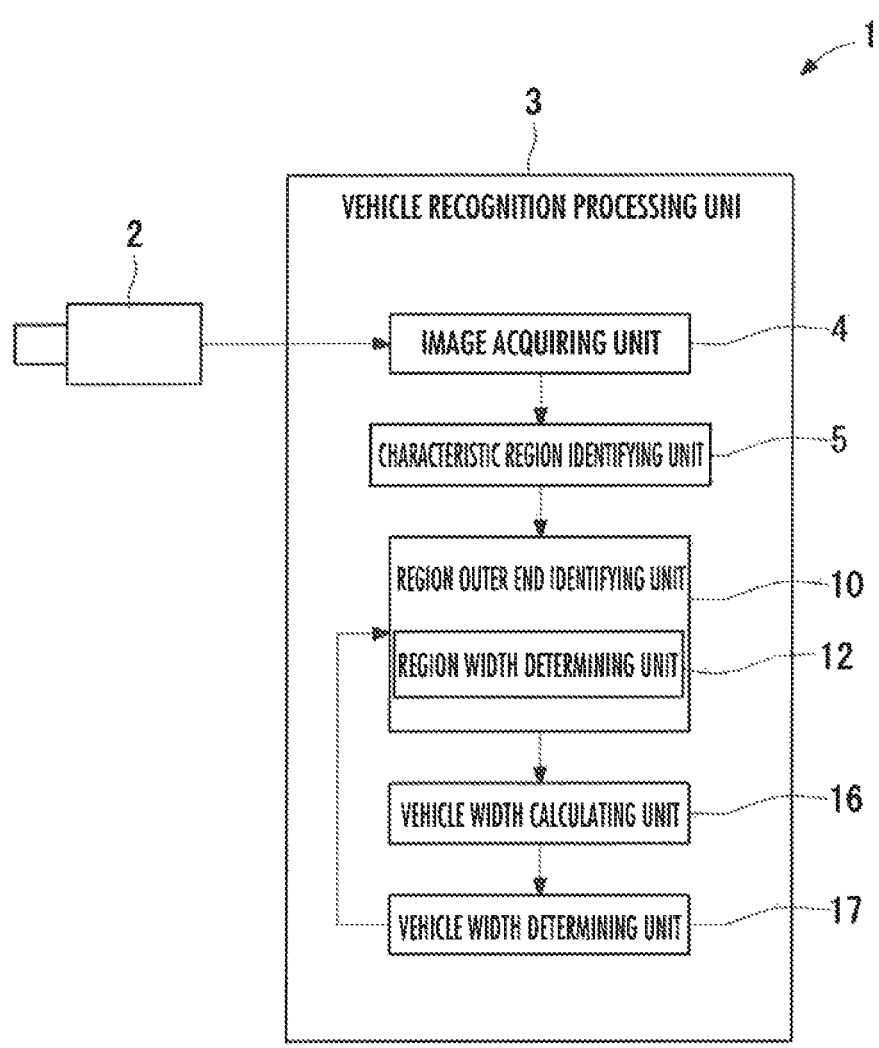

VEHICLE RECOGNITION DEVICE

BACKGROUND OF THE INVENTION

1. Field of the Invention

The present invention relates to a vehicle recognition device configured to identify a pair of lights on both sides of a vehicle in an image, which is obtained through an imaging unit, as a first characteristic region and a second characteristic region.

2. Description of the Related Art

Hitherto, there has been known a vehicle recognition device adapted to recognize, for example, the width of the rear part of a vehicle. The vehicle recognition device has a means for identifying a first characteristic region and a second characteristic region, which are formed of pixels having pixel values in a predetermined range and which are arranged in a horizontal direction in an image obtained through an imaging unit (refer to for example, Japanese Patent Application Laid-Open No. 2009-230530 (hereinafter referred to as "Patent Document 1"). The first and the second characteristic regions are highly likely to correspond to a pair of brake lights located on both sides of the rear part of the vehicle, thus making it possible to recognize the width or the like of the vehicle on the basis of the first and the second characteristic regions.

The vehicle recognition device described in Patent Document 1 has a characteristic region determining means, which determines whether the first and the second characteristic regions belong to regions of the same vehicle, in order to enhance recognition accuracy. For the purpose of the determination, a first determination region is set in a vertical peripheral area of the first characteristic region or a peripheral area in the direction of the second characteristic region, and a second determination region is set at a position that is line-symmetrical to the first determination region relative to the centerline of the first and the second characteristic regions. If the degree of correlation between the first determination region and the second determination region is high, then the determining means determines that the first and the second characteristic regions are regions of the same vehicle.

However, in the vehicle recognition device described above, a brake light of a preceding vehicle and a brake light of a vehicle preceding that vehicle may overlap in an image received from the imaging unit. In this case, according to the aforesaid vehicle recognition device, even if the brake lights are detected as described above at night, the image of the brake light of the vehicle that precedes the preceding vehicle may be combined with the image of the brake light of the preceding vehicle, resulting in the detection of a larger width in the horizontal direction of the brake light of the preceding vehicle.

In this case, the value of the width of the preceding vehicle or the distance to the preceding vehicle calculated on the basis of the images of the brake lights may considerably deviate from an actual value, leading to a possibility of failure to accurately recognize the width or the like of the preceding vehicle.

SUMMARY OF THE INVENTION

In view of the limitations now present in the prior art, it is an object of the present invention to provide a vehicle recognition device capable of more accurately recognizing the width or the like of a vehicle on the basis of a characteristic region corresponding to, for example, a taillight, in an image of the vehicle.

The vehicle recognition device in accordance with the present invention includes: an imaging unit; a characteristic region identifying unit which identifies two characteristic regions, which are composed of pixels having pixel values thereof being within a predetermined range and which are arranged in a horizontal direction in an image obtained through the imaging unit; and a region outer end identifying unit which identifies outer ends in a horizontal direction of the two characteristic regions as portions in the image corresponding to both ends in a vehicle width direction of a single vehicle in the image, wherein the region outer end identifying unit includes a region width determining unit which determines whether or not a difference in width in the horizontal direction between the two characteristic regions is a predetermined value or less, and is configured to identify, as a corrected outer end, a border that is positioned on an inner side by the difference in the width from the outer end of a characteristic region having a larger width in the horizontal direction among the two characteristic regions in a case where the region width determining unit has determined that the difference in the width is not the predetermined value or less.

In the present invention, the portions identified as the two characteristic regions arranged in the horizontal direction in an image obtained through the imaging unit are composed of pixels having pixel values being in a predetermined range. Therefore, insofar as the predetermined range is properly set, the portions are highly likely to correspond to the portions of the left and right taillights of the vehicle. Thus, the width of the vehicle or the distance to the vehicle can be calculated on the basis of the two characteristic regions.

However, if a taillight of the vehicle and a taillight of the preceding vehicle overlap, then the taillights of the two vehicles will be combined in the horizontal direction and may cause the taillights to be detected as having a larger width in the horizontal direction than the actual width. In this case, of the images of the left and right taillights, the image of the taillight that has a smaller width in the horizontal direction is considered to indicate a correct width of the taillight.

According to the present invention, therefore, if the difference in width in the horizontal direction between the two characteristic regions is not the predetermined value or less, then for one of the two characteristic regions that has a larger width in the horizontal direction, the border that is on the inner side by the difference in width from the outer end will be identified as a corrected outer end. Thus, the outer ends of the two characteristic regions correspond more accurately to the outer ends of the taillights of the vehicle, making it possible to more accurately recognize the width of the vehicle or the distance to the vehicle on the basis of the corrected outer end.

In the present invention, the vehicle recognition device may include a vehicle width calculating unit that determines a width of the vehicle based on the outer ends of the two characteristic regions identified without correction by the region outer end identifying unit, and a vehicle width determining unit which determines whether or not the vehicle width obtained by the vehicle width calculating unit is a predetermined value or more, and the region outer end identifying unit may identify the corrected outer end provided that the vehicle width is determined to have a predetermined value or more by the vehicle width determining unit.

An average vehicle has a width within a certain range. Therefore, if it is determined that a vehicle width is a predetermined value or more, then it is highly likely that the vehicle width has been calculated on the basis of a wrong interval between taillights. Hence, identifying the outer ends that have been corrected as described above only in such a case makes it possible to prevent the calculation of a smaller vehicle width than an actual vehicle width, thereby allowing a vehicle width to be more accurately recognized.

BRIEF DESCRIPTION OF THE DRAWINGS

FIG. 1 is a block diagram illustrating the configuration of a vehicle recognition device according to an embodiment of the present invention;

DESCRIPTION OF THE PREFERRED EMBODIMENTS

Figure 2A:
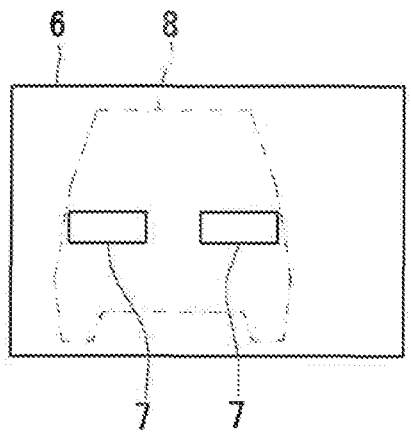
FIG. 2A is as diagram illustrating an example of an image obtained by an imaging unit of the vehicle recognition device in FIG. 1

The following will describe an embodiment of the present invention with reference to the accompanying drawings. As illustrated in FIG. 1, a vehicle recognition device 1 of the embodiment is adapted to recognize the ends or the like of a vehicle on the basis of the taillight portions of the vehicle in an acquired image, and includes an imaging unit 2 and a vehicle recognition processing unit 3 which carries out vehicle recognition processing on the basis of image information obtained through the imaging unit 2.

The imaging unit 2 is constituted of a color camera that uses a CCD or a CMOS. The vehicle recognition processing unit 3 is constituted by using a computer and a program or a logic circuitry equivalent thereto, or a processor suited to image recognition.

The vehicle recognition processing unit 3 includes an image acquiring unit 4 which acquires image information as an imaging result provided by the imaging unit 2, and a characteristic region identifying unit 5 which specifies a predetermined characteristic region in the image composed of the image information. The image acquiring unit 4 acquires image information of one frame from the imaging unit 2, for example, every few tens of milliseconds and stores the acquired image information in an image memory. The characteristic region identifying unit 5 identifies a predetermined characteristic region according to the image information for each frame sequentially stored in the image memory.

The regions that are to be extracted as the characteristic regions are the regions in which, for example, the luminance value of an RGB component constituting the light of a red region, such as the light emitted or reflected from the taillights 7, is a predetermined level or more, as in the case of the example of an image 6 illustrated in FIG. 2A. Then, the characteristic region identifying unit 5 identifies, among the characteristic regions, two characteristic regions that are highly likely to correspond to a pair of the taillights 7 on a single vehicle 8, as illustrated in FIG. 2A.

Figure 2B:
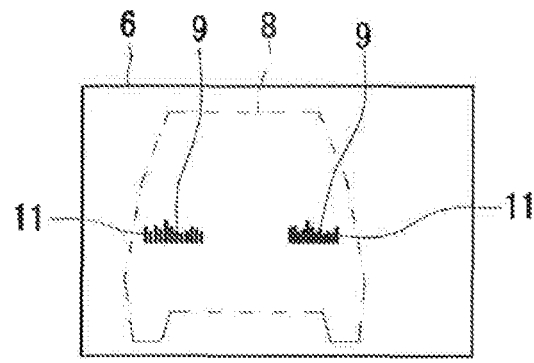
FIG. 2B is a diagram illustrating two characteristic regions in the image of FIG. 2A in terms of red region luminance distribution.

In other words, as the two characteristic regions, two characteristic regions 9 arranged in the horizontal direction are identified, as illustrated in FIG. 2B. This is because the characteristic regions corresponding to the pair of the taillights 7 are generally required to be arranged in the horizontal direction. In FIG. 2B, the positions in the vertical direction and the width range in the horizontal direction of the two characteristic regions 9 are indicated by the diagrams illustrating the distribution of the aforesaid luminance values.

Further, the vehicle recognition processing unit 3 is provided with a region outer end identifying unit 10, which identifies the outer ends of the two characteristic regions 9 identified by the characteristic region identifying unit 5. The region outer end identifying unit 10 identifies, for example, outer ends 11 of the two characteristic regions 9 illustrated in FIG. 2B.

The region outer end identifying unit 10 is provided with a region width determining unit 12, which determines whether or not the difference in width in the horizontal direction between the two characteristic regions 9 identified by the characteristic region identifying unit 5 is a predetermined value or less. If the region width determining unit 12 determines that the difference in width between the two characteristic, regions 9 is not the predetermined value or less, then this will be taken into account in identifying the outer ends 11.

More specifically, if it is determined by the region width determining unit 12 that the difference in width is not the predetermined value or less, then the region outer end identifying unit 10 identifies, as a corrected outer end, a border positioned on the inner side by the difference in width from an outer end as the outer end of one of the two characteristic regions 9 that has a larger width in the horizontal direction. If the difference in width is not the predetermined value or less, then it is likely that the characteristic region 9 that has a larger width has a width that is larger than the actual width of the taillight 7, and the foregoing correction is made to obviate the occurrence of an inconvenience attributable thereto.

Figure 3A:
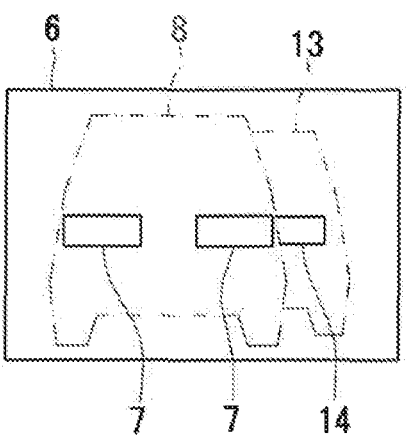
FIG. 3A is a diagram similar to FIG. 2A except that a taillight of a preceding vehicle and a taillight of a vehicle that precedes the preceding vehicle are overlapped and combined and FIG. 3B is a diagram similar to that of FIG. 2B except that FIG. 3B illustrates the case of FIG. 3A.
Figure 3B:
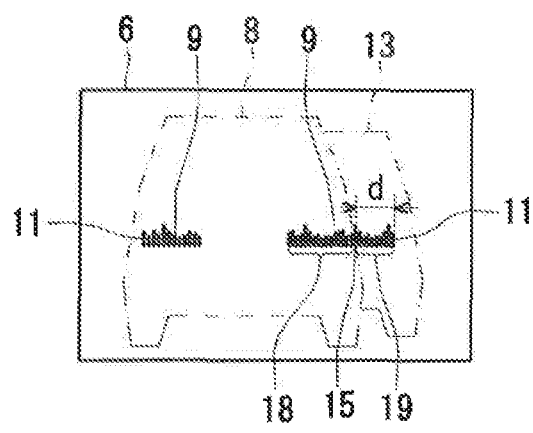

Such a case may take place when one of the two taillights 7 of the vehicle 8 overlaps and combines with a taillight 14 of another vehicle 13 in the horizontal direction, as illustrated in FIG. 3A. If this happens, regarding the right characteristic region 9 having a larger width, the border positioned on the inner side by a difference in width d from the outer end 11 of the characteristic region 9 is identified as a corrected outer end 15, as illustrated in FIG. 3B. The corrected outer end 15 is more likely to be the actual outer end of the corresponding taillight 7 than the outer end 11 before the correction.

Further, the vehicle recognition processing unit 3 includes as vehicle width calculating unit 16 that determines the width of the vehicle 8 on the basis of the outer ends 11 of the two characteristic regions 9, which have been identified by the characteristic, region identifying unit 5, or on the basis of the corrected outer end 15, and a vehicle width determining unit 17 that determines whether or not the determined width of the vehicle 8 is a predetermined value or more.

The determination by the vehicle width determining unit 17 is carried out to determine whether or not to make the correction based on the corrected outer end 15 by the region outer end identifying unit 10 as described above. In other words, the aforesaid correction is made on the characteristic region 9 of the vehicle 8 provided that the vehicle width determining unit 17 has determined that the width of the vehicle 8 is the predetermined value or more.

Figure 4:
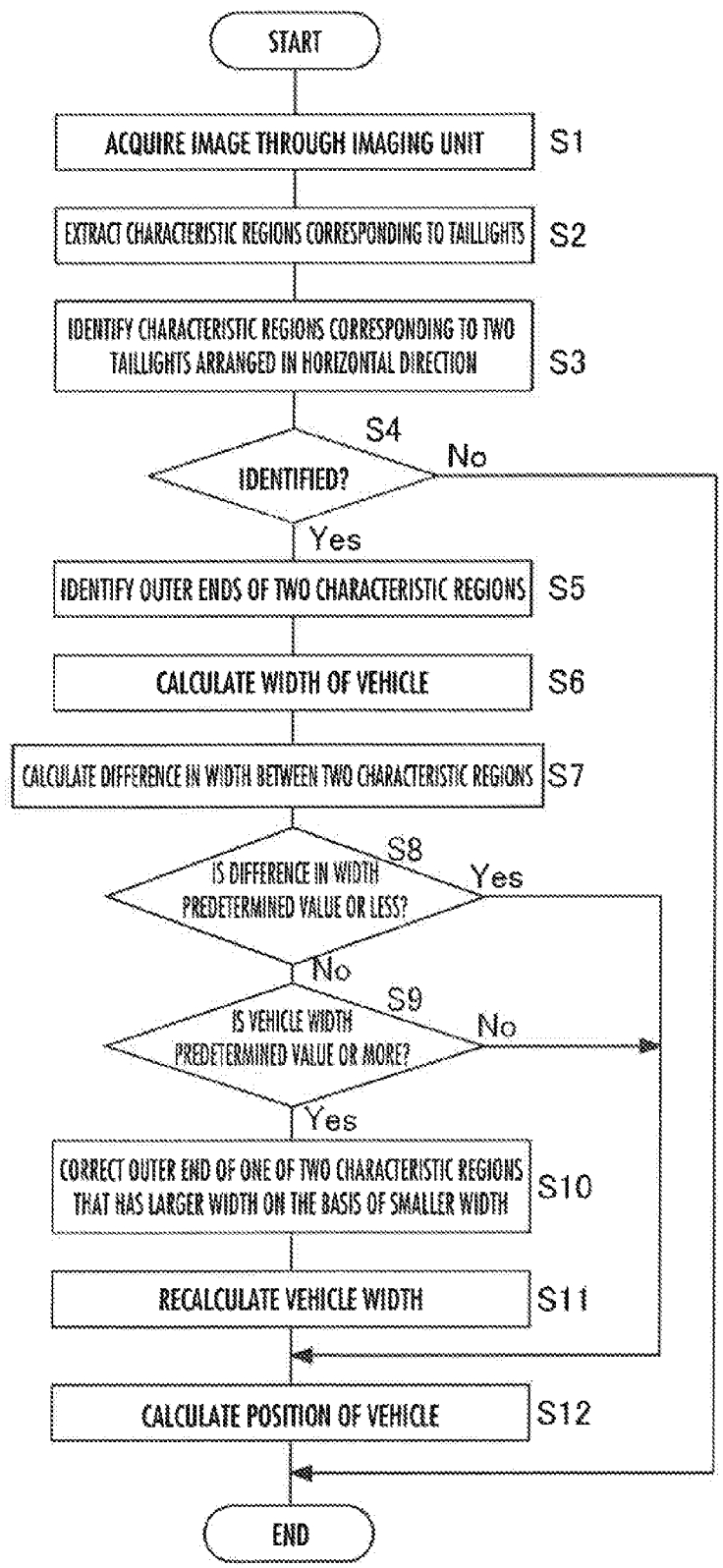
FIG. 4 is a flowchart illustrating the vehicle recognition processing by a vehicle recognition processing unit in the vehicle recognition device illustrated in FIG. 1.

In the configuration, the vehicle recognition processing unit 3 carries out the vehicle recognition processing illustrated in FIG. 4 thereby to calculate the position of the vehicle 8 in the image 6 in FIG. 2A, which is obtained through the imaging unit 2. The vehicle recognition processing is carried out, for example, every few tens of milliseconds.

When the vehicle recognition processing is begun, the vehicle recognition processing unit 3 acquires one frame of image data from the imaging unit 2 by the image acquiring unit 4 and stores the acquired image data in the image memory in step S1. Based on the image 6 composed of the stored image data, the position of the vehicle 8 is calculated according to the following procedure.

First, the characteristic region identifying unit 5 identifies the two characteristic regions 9 corresponding to the pair of the taillights 7 on the rear end of the vehicle 8 in the image 6. In other words, the characteristic regions 9 corresponding to the taillights 7 are extracted in step S2. The characteristic regions 9 are the regions in which the luminance values of the RGB components corresponding to the light in the red region are a predetermined level or more.

Then, of these characteristic regions 9, the characteristic regions 9 corresponding to the two taillights 7 arranged in the horizontal direction are identified in step S3. Whether or not the characteristic regions 9 are arranged in the horizontal direction is determined by checking whether or not the positional difference in the vertical direction lies within a predetermined range. Thus, the two characteristic regions 9 corresponding to the pair of the two taillights 7 on the vehicle 8 are identified, as illustrated in FIG. 2.

Addition of another requirement to the condition to be satisfied by the two characteristic regions 9 that are to be identified may be considered. For example, as described in Japanese Patent Application Laid-Open No. 2009-230530, the condition may be that the two characteristic regions 9 are line-symmetrical or a condition that the difference in the mean value of the luminance values in peripheral areas of the two characteristic regions 9, the peripheral areas being line-symmetrical relative to the centerline of the two characteristic regions 9, is a predetermined value or less. This makes it possible to more accurately identify the two characteristic regions 9 on the single vehicle 8.

Subsequently, in step S4, it is determined whether or not the two characteristic regions 9 have been identified. If the two characteristic regions 9 have not been identified, then the vehicle recognition processing is terminated. In this case, the vehicle recognition processing is started again after the lapse of a predetermined period of time, for example, a few tens of milliseconds, and the same processing is carried out on the image of the next frame.

If it is determined that the two characteristic regions 9 have been identified, then the region outer end identifying unit 10 identifies the outer ends 11 of the two characteristic regions 9, and the vehicle width calculating unit 16 calculates the vehicle width of the vehicle (steps S5 to S11). More specifically, first, in step S5, the outer ends 11 of the two characteristic regions 9 are identified by the region outer end identifying unit 10. Then, in step S6, the vehicle width calculating unit 16 calculates the vehicle width of the vehicle 8 on the basis of the outer ends 11 identified in step S5.

Subsequently, the region width determining unit 12 calculates the difference in width between the two characteristic regions 9 in step S7, and it is determined whether or not the difference in width is a predetermined value or less in step S8. Whether or not the difference in width is the predetermined value or less means whether or not the widths of the two characteristic regions 9 are substantially the same.

If it is determined that the difference in width is the predetermined value or less, then it is highly likely that there is not a substantial difference in width between the two characteristic regions 9 and there is no overlap between the taillight 7 and the taillight 14, as illustrated in FIG. 3A and FIG. 3B, so that the process proceeds directly to step S12. In this case, the processing in step S12 is carried out on the basis of the width of the vehicle 8 calculated in step S6.

If it is determined in step S8 that the difference in width is not the predetermined value or less, then it is highly likely that the widths of the two characteristic regions 9 are substantially different and that the characteristic region 9 having the larger width indicates that a characteristic region 19 of the taillight 14 of the another vehicle 13 overlaps and combines with an intended characteristic region 18 of the taillight 7 of the vehicle 8, as illustrated in FIG. 3A and FIG. 3B.

In this case, therefore, in order to determine whether or not the characteristic region 9 having the larger width should be corrected, it is determined in step S9 whether or not the vehicle width calculated in step S6 is the predetermined value or more. In this determination, it is determined whether or not the vehicle width of the vehicle 8 is larger than that of an average vehicle. Further, the width of an average vehicle is considered to vary depending on the height of taillights or the distance between the inner ends of the taillights, so that a value that varies according to the height or the distance is used as the predetermined value to be compared with the vehicle width.

If it is determined in step S9 that the vehicle width is not the predetermined value or more, then it means that the vehicle width calculated in step S8 is not larger than the vehicle width of an average vehicle, so that the process proceeds to step S12. In this case, the outer ends 11 identified in step S5 correspond to the both ends of the vehicle 8, and the width of the vehicle 8 calculated in step S6 is directly adopted as a correct width and the processing in step S12 is carried out.

Further, in this case, even if one of the taillights 7 is composed of a plurality of bulbs and some of them are off, leading to the occurrence of a difference in width between the two characteristic regions 9, the vehicle width of the vehicle 8 calculated in step S6 is not larger than that of an average vehicle. Hence, the outer ends 11 identified in step S5 are regarded as correct and the vehicle width is directly adopted. This prevents an inaccurate outer ends from being identified due to a correction of the outer ends 11, which will be discussed hereinafter.

If it is determined in step S9 that the vehicle width of the vehicle 8 calculated in step S6 is the predetermined value or more, then it means that the vehicle width is larger than that of an average vehicle. For this reason, the outer ends 11 identified in step S5 are highly likely to have been erroneously identified due to the characteristic region 19 which belongs to the another vehicle 13 illustrated in FIG. 3B.

In this case, therefore, the outer end 11 of one of the two characteristic regions 9 that has a larger width is corrected using the characteristic region 9 having a smaller width in step S10. In other words, on one of the two characteristic regions 9 that has a larger width in the horizontal direction, the border positioned on the inner side by the difference in width d from the outer end 11 is identified as the corrected outer end 15, as illustrated in FIG. 3B. In this case, the vehicle width of the vehicle 8 is recalculated in step S11 by the vehicle width calculating unit 16 on the basis of the corrected outer end 15, and the processing in step S12 is carried out.

In step S12, the position of the vehicle 8 is calculated on the basis of the width of the vehicle 8, which has been calculated in step S6 or recalculated in step S11. The calculated position of the vehicle 8 is used to, for example, prevent the self vehicle, which is provided with the vehicle recognition device 1 from colliding with the vehicle 8.

As described above, according to the present embodiment, if the difference in width between the two characteristic regions 9 identified by the characteristic region identifying unit 5 is not the predetermined value or less, then on the characteristic region 9 that has a larger width, the border positioned on the inner side by the difference in width from the outer end 11 is identified as the corrected outer end 15.

With this arrangement, the outer ends 11 and 15 of the two characteristic regions 9 correspond more accurately to the outer ends of the taillights 7 of the vehicle 8, thus making it possible to more accurately recognize the width of the vehicle 8 or the distance to the vehicle 8.

At that time, the outer end 11 of the characteristic region 9 having the larger width is corrected to the outer end 15 provided that the vehicle width calculated on the basis of the outer end 11 before the correction is the predetermined value or more. This prevents an erroneous correction from being made.

The above has described an embodiment of the present invention, but the present invention is not limited thereto. For example, the characteristic regions to be identified by the characteristic region identifying unit are not limited to those corresponding to the taillights 7 and may correspond to a pair of brake lights, a pair of fog lights, reverse lights or the like, or even the lights of an oncoming vehicle.

DESCRIPTION OF REFERENCE NUMERALS

1 . . . Vehicle recognition device; 2 . . . Imaging unit; 6 . . . Image; 9 . . . Characteristic region; 5 . . . Characteristic region identifying unit; 8, 13 . . . Vehicle; 11 . . . Outer end; 10 . . . Region outer end identifying unit; 12 . . . Region width determining unit; 15 . . . Outer end; 16 . . . Vehicle width calculating unit; and 17 . . . Vehicle width determining unit

What is claimed is:

1. A vehicle recognition device comprising:
an imaging unit;
a logic circuitry or processor, including:
a characteristic region identifying unit which identifies two characteristic regions, which are composed of pixels having pixel values being within a predetermined range and which are arranged in a horizontal direction in an image obtained by the imaging unit; and
a region outer end identifying unit which identifies outer ends in a horizontal direction of the two characteristic regions as portions in the image corresponding to both ends in a vehicle width direction of a single vehicle in the image,
wherein the region outer end identifying unit includes
a region width determining unit which determines whether or not a difference in width in the horizontal direction between the two characteristic regions is a predetermined value or less,
and is configured to identify, as a corrected outer end, a border that is positioned on an inner side by the difference in the width from the outer end of a characteristic region having a larger width in the horizontal direction among the two characteristic regions in a case where the region width determining unit has determined that the difference in the width is not the predetermined value or less.

2. The vehicle recognition device according to claim 1, comprising:
a vehicle width calculating unit that determines a width of the vehicle based on the outer ends of the two characteristic regions identified without being corrected by the region outer end identifying unit; and
a vehicle width determining unit which determines whether or not the vehicle width obtained by the vehicle width calculating unit is a predetermined value or more,
wherein the region outer end identifying unit identifies the corrected outer ends provided that the vehicle width determining unit has determined that the vehicle width is a predetermined value or more.

* * * * *